Patented July 6, 1937

2,086,064

UNITED STATES PATENT OFFICE 2,086,064

PROCESS FOR PREPARING CHEMICALLY ACTIVE ARTIFICIAL ASPHALTS

Johannes Benedict Carpzow, Bornsen, near Hamburg, Germany

No Drawing. Application December 30, 1935, Serial No. 56,837. In Belgium March 17, 1935

9 Claims. (Cl. 106—31)

The known natural or artificially prepared asphalts are inactive chemically and consequently when used in admixture with mineral fillers, such as for example coarse or ground stone material, sand, gravel and so forth for making street coverings, roofing paper or board, coating masses or the like, they are not capable of combining with these substances chemically. As a result when such mixtures are heated, such as for example by the rays of the sun in hot regions, the individual constituents thereof frequently separate again; further such mixtures are not perfectly stable towards water, but on the contrary absorb it in considerable quantities which in the course of time leads to the destruction of the texture of such mixtures.

According to the present invention artificial asphalts which are capable of combining chemically with mineral substances and which maintain this property for an unlimited time are obtained by intimately mixing the colloidal substances obtainable from salt or fresh water mud or slime by washing away the hard crystalline constituents, such as sand, chalk, silicates, and consisting for the most part of oxygen-free and/or oxygen-poor silicon compounds of the type of silicides or of silicon-hydride or silicon alkyl compounds or of silicon suboxides, in the naturally moist state or freed from mechanically bound water by drying at low temperatures in the absence of air, with bituminous substances, such as for example natural or artificial asphalt, coal tars and so forth or emulsions of these substances, and then heating the mixture in a vacuum to temperatures of about 180° C. until the water of constitution of the colloid substances is completely expelled as well, for which purpose usually several hours are necessary. During this treatment a complete destruction of the capillary structure of the mud colloids sets in as a result of which the chemically reactive compounds are liberated but at the same time are protected from oxidation and other chemical changes by the organic colloid substances which cover them so that they are stable in this form for an indefinite time. If now when required a chemically active artificial asphalt prepared in this way is brought into intimate contact with metals or metal compounds, such as for example with silicates or other varieties of stone material, the artificial asphalt preferably being first of all melted and intimately mixed with the said substances, then the chemically active compounds contained in it enter into a chemical reciprocal action with the additional substances with gradual formation of a unitary mass of particularly high strength and hardness, and a material is obtained which even on heating no longer separates into its constituents and no longer takes up water. Consequently in this way street coverings, material for filling or pouring in between stones and stone blocks, roof coverings and so forth can be made of particularly high strength, compactness and water resistivity.

By way of example, in proceeding according to the invention, sea water mud, which is rich in unsaturated, that is to say oxygen-poor and/or oxygen-free, colloidally dispersed silicon compounds, is first of all freed from coarsely dispersed hard-crystalline portions such as sand, chalk and so forth, by washing the same out and then allowing to settle or centrifuging off whereby a colloidal elutriated mass is obtained containing about 40 to 50% of mechanically bound water which can be removed by carefully drying the mass at low temperatures, preferably not exceeding 100° C., as far as possible in the absence of air. The mass which has been preliminarily dried in this way, or if desired the preliminarily purified naturally moist mud, is then intimately mixed with varying quantities, advantageously from half the weight up to an equal amount by weight, (referred to the dry mud) of a bituminous substance, such as for example a natural or artificial asphalt, coal tar or the like and the mixtures thereupon heated in a vacuum at about 180° C. until no more water escapes, which as a rule requires several hours. An artificial asphalt is obtained as the end product which possesses the above-mentioned valuable properties.

It is already known to make artificial masses which can be used for many purposes by mixing salt or fresh water muds in the naturally moist state, or after having been dried at low temperature in the absence of air, with organic colloid substances and then further working up this mixture in the known manner particularly by pressing it in shapes or moulds under pressure and heat.

However asphalt-like products of the valuable properties possessed by the artificial asphalts obtained according to the present invention are not obtained in this manner even when using bituminous colloid substances, since it was not known that artificial asphalts having particularly valuable technical properties can be obtained by subsequent destruction of the capillaries of the colloidal mud particles containing further properties of chemically active compounds in the presence of organic protective colloids.

What I claim is:—

1. A method of making chemically active stable artificial asphalts consisting in intimately mixing together bituminous substances and chemically active colloid silicon compound constituents of natural water mud deposits, and heating the mixture in a vacuum at about 180° C. until the constitutionally bound water in said colloid material is completely expelled.

2. A method of making chemically active stable artificial asphalts consisting in intimately mixing at least one bituminous substance selected from the group: natural asphalt, artificial asphalt and coal tar, with chemically active colloid silicon compound constituents of natural water mud deposits, and heating the mixture in a vacuum at about 180° C. until the constitutionally bound water in said colloid material is completely expelled.

3. A method of making chemically active stable artificial asphalts consisting in intimately mixing together bituminous substances and chemically active colloid silicon compound constituents of natural water mud deposits, said colloid material being used in the naturally moist state, and heating the mixture in a vacuum at about 180° C. until the constitutionally bound water in said colloid material is completely expelled.

4. A method of making chemically active stable artificial asphalts consisting in gently drying chemically active colloid silicon compound constituents of natural water mud deposits in the absence of air in order to free them from adhering water, intimately mixing the said dried colloid material with bituminous substances and heating the mixture in a vacuum at about 180° C. until the constitutionally bound water in said colloid material is completely expelled.

5. A method of making chemically active stable artificial asphalts consisting in intimately mixing together emulsified bituminous substances and chemically active colloid silicon compound constituents of natural water mud deposits, and heating the mixture in a vacuum at about 180° C. until the constitutionally bound water in said colloid material is completely expelled.

6. A method of making chemically active stable artificial asphalts consisting in intimately mixing together emulsified bituminous substances and chemically active colloid silicon compound constituents of natural water mud deposits, said colloid material being used in the naturally moist state, and heating the mixture in a vacuum at about 180° C. until the constitutionally bound water in said colloid material is completely expelled.

7. A method of making chemically active stable artificial asphalts consisting in gently drying chemically active colloid silicon compound constituents of natural water mud deposits in the absence of air in order to free them from adhering water, intimately mixing the said dried colloid material with emulsified bituminous substances, and heating the mixture in a vacuum at about 180° C. until the constitutionally bound water in said colloid material is completely expelled.

8. A method of making chemically active stable artificial asphalts consisting in gently drying chemically active colloid silicon compound constituents of natural water mud deposits in the absence of air in order to free them from adhering water, intimately mixing the said dried colloid material with at least one bituminous substance selected from the group: natural asphalt, artificial asphalt and coal tar, and heating the mixture in a vacuum at about 180° C. until the constitutionally bound water in said colloid material is completely expelled.

9. A method of making chemically active stable artificial asphalts consisting in intimately mixing together bituminous substances and chemically active colloid silicon compound constituents of natural water mud deposits, the weight of bituminous substances in the mixture being from 50% to 100% of the weight of the dry content of the colloid material, and heating the mixture in a vacuum at about 180° C. until the constitutionally bound water in said colloid material is completely expelled.

JOHANNES BENEDICT CARPZOW.